UNITED STATES PATENT OFFICE.

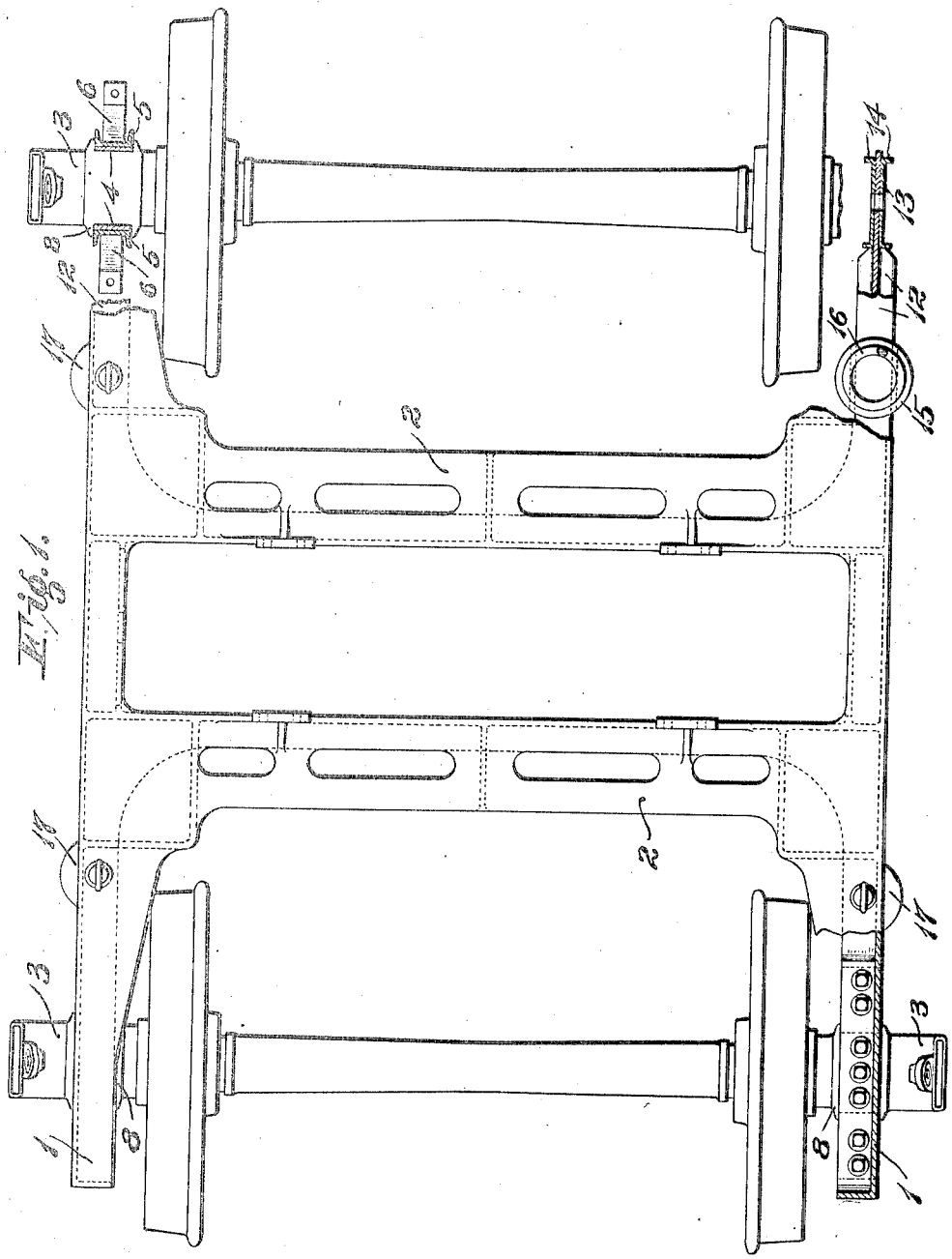

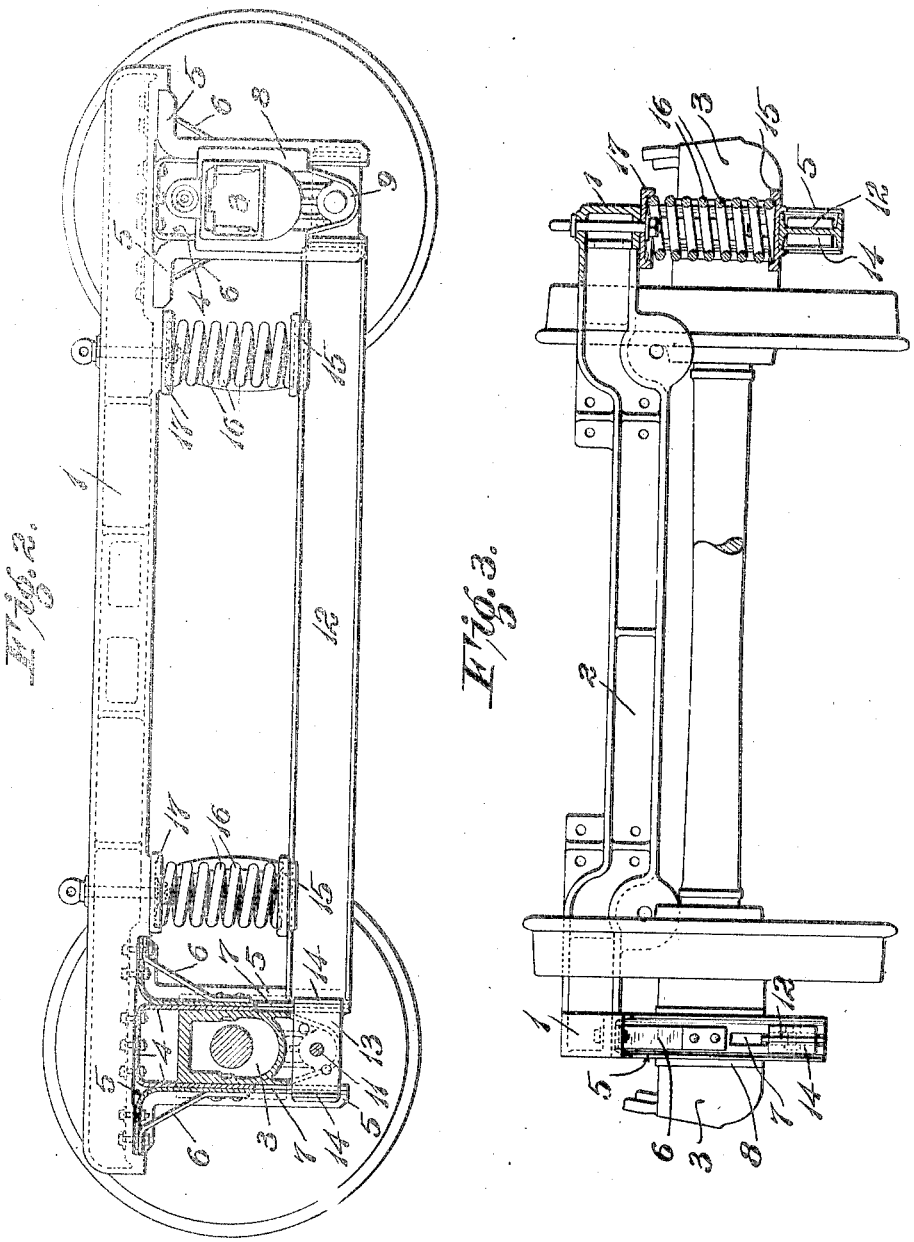

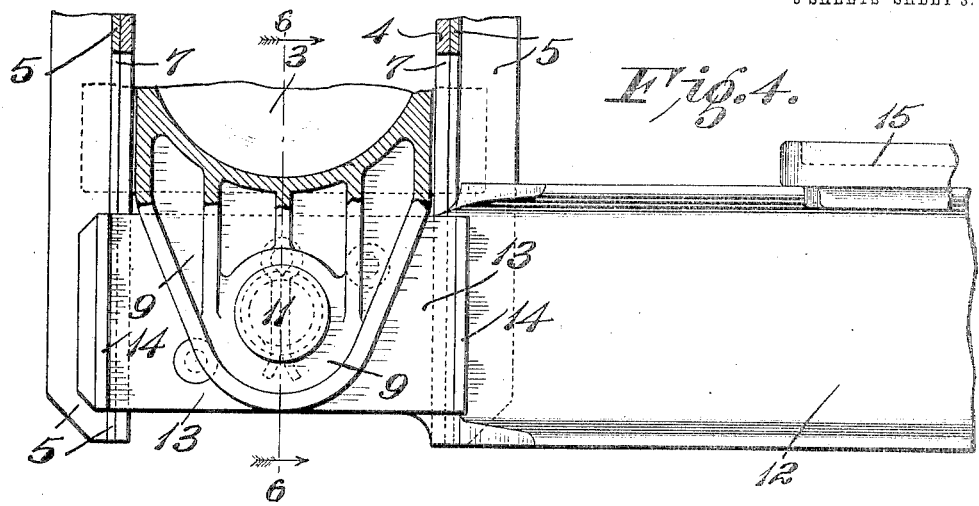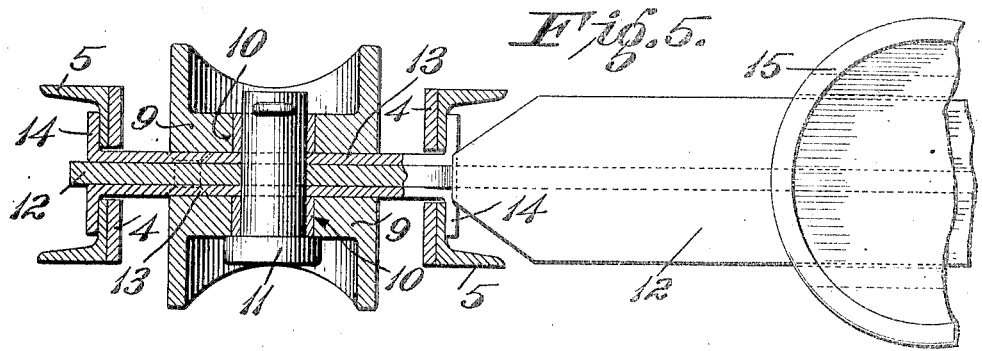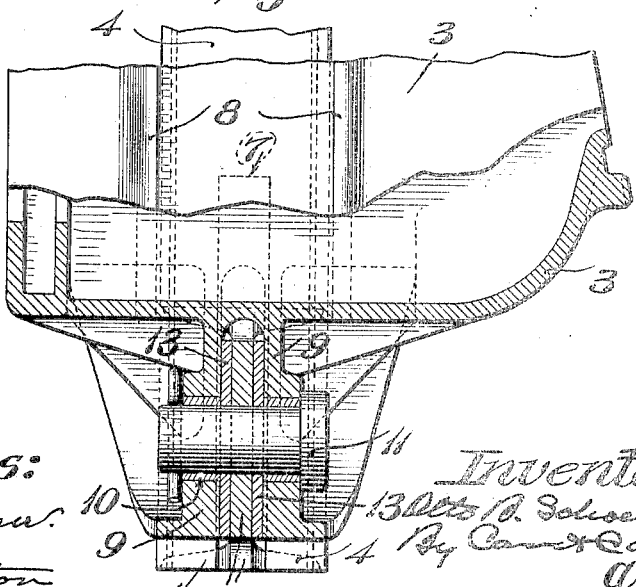

OTTO B. SCHOENKY, OF EASTON, CALIFORNIA.

EQUALIZER FOR CAR-TRUCKS.

1,009,795.

Specification of Letters Patent. Patented Nov. 28, 1911.

Application filed January 20, 1911. Serial No. 603,725.

*To all whom it may concern:*

Be it known that I, OTTO B. SCHOENKY, a citizen of the United States, and a resident of the city of Easton, in the county of San Mateo and State of California, have invented a new and useful Improvement in Equalizers for Car-Trucks, of which the following is a specification.

This invention relates to car trucks and more particularly to equalizers for passenger car trucks.

It has for its objects to minimize the weight of the equalizing bar without sacrificing the strength thereof, to provide for the use of a straight bar in lieu of the usual curved and bent bars, and to attain certain other advantages hereinafter more fully appearing.

The invention consists in the parts and in the arrangements and combinations of parts hereinafter described and claimed.

In the accompanying drawings which form part of this specification and wherein like symbols refer to like parts wherever they occur,—Figure 1 is a view partly in top plan and partly in horizontal section, showing the main portions of a truck frame equipped according to my invention; Fig. 2 is a view partly in side elevation and partly in vertical section, showing the application of the equalizing bar to the car truck; Fig. 3 is a view partly in end elevation and partly in transverse section, of the parts shown in Figs. 1 and 2; Fig. 4 is a fragmentary view on an enlarged scale, showing the manner of connecting the equalizing bar to the journal boxes; Fig. 5 is a view partly in top plan and partly in horizontal section, of the parts shown in Fig. 4; and Fig. 6 is a section on the line 6—6 of Fig. 4.

According to the common practice, in nearly every instance, the equalizer for passenger car trucks comprises a solid flat metal bar of rectangular section whose opposite end portions are bent or offset upwardly and rest on the tops of the respective journal boxes. Upon these equalizing bars the weight of the truck is balanced by placing equalizer springs between the equalizing bar and truck frame on opposite sides of the truck bolster and adjacent to the respective journal boxes. Obviously, therefore, the equalizing bars are usually the heaviest individual members in the truck construction.

My invention contemplates the substitution of a straight equalizing bar of flanged commercially rolled section, preferably an I-beam, owing to its exceeding rigidity for a minimum weight. So, too, by producing a straight bar and connecting it to the bottoms of the journal boxes, the length thereof is obviously shorter than the bent bar whose end portions are supported on top of the journal boxes.

Referring to the drawings, it is noted that only so much of the car truck construction as coöperates directly with the present invention is illustrated. That is, the bolster, bolster springs, spring plank and other parts carried by the main frame are eliminated. The truck, as shown, comprises a top or main frame, the same comprising side members 1 and cross connecting members or transoms 2 rigidly secured thereto or integral therewith. Mounted on the under sides of the side members 1, near the opposite ends thereof, are the column guides or pedestals for the journal boxes 3. These column guides preferably comprise plates 4 which are bent into inverted U-shape and riveted or bolted at their middle portions to said side members 1 of the truck frame. These plates 4 are reinforced by channel members 5 which are riveted to the outer faces thereof, and whose upper end portions are bent and bolted or riveted to the under sides of the said side members 1 of the truck frame. The column guide or pedestal structure is suitably braced by stays 6; and the lower portions of the pedestal plates 4 and reinforcing channels 5 are slotted vertically as at 7.

The journal boxes 3 are fitted loosely between the column guides or pedestals so as to move vertically therein, and said journal boxes are provided with retaining flanges 8, which overlap the sides of the pedestals. Depending from the bottoms of the journal boxes 3, are lugs or ears 9 which are slotted or bifurcated and perforated horizontally. The perforations are provided with bushings 10 to receive securing pins 11 hereinafter more fully set forth.

Preferably, the equalizing bar comprises an I-beam 12 having its flanges sheared or cut from its opposite end portions, to the opposite faces of which are riveted plates 13 whose opposite end portions are flanged as at 14. The end portions of the I-beam 12 having the plates 13 secured thereon are fitted in the slotted portions 7 of the column guides or pedestals; and said plates 13 are of such length that their flanged portions 14 fit over the faces of the respective channel members 5 of the column guides.

The end portions of the I-beam or equalizing bar 12 have perforations therein through which the securing pin 11 is passed. Preferably, the pin 11 fits tightly in the perforations in said equalizing bar, but is fitted loosely or rotatably in said bushings 10 in the ears or lugs 9 of the journal boxes.

Mounted on the tops of the equalizing bars 12, near the opposite ends thereof, and adjacent to the inner sides of the respective pedestals, are spring seats 15. Seated on these spring seats 15 are coiled springs 16 whose upper ends are seated in seats 17 bolted to the under sides of said side portions 1 of the main truck frame. It will thus be seen that the equalizing bar or beam 12 is carried by the journal boxes which are provided with the depending lugs to which the opposite end portions of said equalizing bar are pivotally connected; and the main truck frame being supported by the springs 16 substantially at the four corners and adjacent to the column guides which are permitted a vertical movement with respect to the journal boxes, the weight of the truck is equalized or balanced on the four journals, in the case of a four wheel truck. Obviously, however, the same arrangement may be applied to a six wheel truck. That is, a pair of equalizing bars will be provided on each side of the truck, the meeting end portions of each pair being pivoted to the respective middle journal boxes. This construction being obvious, it has been deemed unnecessary to illustrate same in the accompanying drawings.

As above set forth, the equalizing bar is preferably an I-beam section, owing to its great strength in proportion to its weight. However, I do not wish to be limited to any particular cross section of channeled or flanged beam. Nor do I wish to be limited to a single or integral commercially rolled or pressed section, as it is obvious that the equalizer bar may comprise a built up or structural beam of two channel sections placed back to back and riveted together, or of angle sections and plates.

By providing the straight equalizing bar or beam and connecting the same to the under side of the journal boxes, a much shorter member may be used. This minimizes the weight and, also, by the arrangement of the straight equalizing beam, as shown and described, it is possible to omit the usual pedestal tie bars and tie bolts which are usually provided at the bottom of the pedestal, thus saving additional weight.

While the equalizing bar has been illustrated as pivoted to the depending lugs or ears on the bottoms of the journal boxes, obviously there are other methods of fastening the equalizing bar to the bottoms of the journal boxes, either by means of straps suspended from the tops of the boxes or otherwise. Therefore, I do not wish to be limited to the specific construction and arrangement shown.

What I claim is:

1. In a car truck, the combination with the journal boxes, of a main truck frame mounted above said journal boxes and having depending pedestals fitted over said journal boxes and movable vertically thereon, an equalizing bar beneath said main truck frame and extending under the respective journal boxes and secured to the latter, means on said equalizing bar independent of its connection with the journal boxes slidably engaging said pedestals, and springs interposed between said equalizing bar and said main truck frame.

2. In a car truck, the combination with the journal boxes, of a substantially straight equalizing bar hingedly connected at its opposite ends to the under sides of the respective journal boxes by pivot studs extending transversely therethrough.

3. In a car truck, the combination with the journal boxes having depending lugs on their bottoms, of an equalizing bar pivotally connected at its opposite ends to the lugs on the adjacent journal boxes by pivot studs extending transversely therethrough.

4. In a car truck, the combination with the journal boxes, of an equalizer comprising a straight horizontal bar whose opposite end portions are hingedly connected to the respective journal boxes at the under sides thereof, and means on the equalizing bar slidably engaging the truck frame independent of the connection between the equalizing bar and journal boxes.

5. In a car truck, the combination with the journal boxes, of an equalizer comprising an I-beam whose flanges are removed from its opposite end portions and whose end web portions are connected to the respective journal boxes at the under sides thereof.

6. In a car truck, the combination with the journal boxes, of a main truck frame mounted above said journal boxes, pedestals secured on said main frame and depending therefrom, said pedestals being fitted over the respective journal boxes so as to permit relative vertical movement thereof, equalizer beams at the sides of said truck, each equalizer beam having its end portions secured to the respective journal boxes at the under sides of said journal boxes and being slidably connected to said pedestals to permit relative vertical movement thereof and serve as a tie rod for the truck frame, and springs interposed between said equalizer beam and said main truck frame.

7. In a car truck, the combination with the journal boxes, of a main truck frame mounted above said journal boxes, pedestals secured on said main truck frame and depending therefrom, said pedestals being slidably fitted over said journal boxes so as to move vertically thereon and the lower portions of said pedestals being slotted vertically, an equalizer comprising a flanged beam whose opposite end portions are slidably fitted through the vertically slotted portions of said pedestals and connected to the respective journal boxes at the under sides thereof, guides on said flanged beam adapted to slidably engage the respective pedestals so as to move vertically thereon but preventing endwise movement with respect to them, and springs interposed between said flanged beam and said main truck frame.

8. In a car truck, the combination with the journal boxes, of a main truck frame, pedestals secured on said main truck frame and depending therefrom, said pedestals being slidably fitted over the respective journal boxes so as to move vertically thereon, an equalizer beam located below said main truck frame, the intermediate portion of the equalizer beam being of I-section, said beam being hingedly connected at its opposite ends to the adjacent journal boxes, guide flanges on the end portions of said equalizer beam slidably engaging the adjacent pedestals so as to permit vertical movement of the pedestals with respect to said equalizer beam but prevent independent endwise movement thereof.

9. In a car truck, the combination with the journal boxes, said journal boxes having depending lugs which are perforated transversely, of a main truck frame, pedestals secured on said main truck frame and depending therefrom, said pedestals being slidably fitted over the respective journal boxes so as to move vertically thereon, and an equalizer comprising a flanged beam whose opposite end portions are perforated, pivot bolts inserted through the perforations in said flanged beam and through the perforations in the lugs on the contiguous journal boxes, and springs interposed between said flanged beam and said main truck frame.

10. In a car truck, the combination with the journal boxes, said journal boxes having lugs depending from the bottoms thereof and perforated transversely, of a main truck frame, pedestals secured on said main truck frame and depending therefrom, said pedestals being slidably fitted over the respective journal boxes so as to move vertically thereon, and an equalizer comprising a flanged beam provided with perforations near its opposite ends, pivot bolts secured through the perforations in said flanged beam and the perforations in the lugs of the contiguous journal boxes, guides on said flanged beam slidably engaging the respective pedestals so that said flanged beam is free to move vertically thereon but is held against endwise movement with respect thereto, and springs interposed between said flanged beam and said main truck frame.

11. In a car truck, the combination with the journal boxes, of a main truck frame comprising side members located above the respective journal boxes, pedestals secured on said side members of the main truck frame and depending therefrom, said pedestals being slidably fitted over the respective journal boxes so as to move vertically thereon, and the lower portions of said pedestals being slotted vertically, and an equalizer comprising a flanged beam whose opposite end portions are slidably fitted in the vertical slots in the adjacent pedestals and secured to the coöperating journal boxes, guides on said flanged beam arranged and adapted to slidably engage the respective pedestals, whereby said flanged beam is permitted to move vertically but is held against independent endwise movement, and springs interposed between said flanged beam and adjacent side member of the main truck frame.

12. In a car truck, the combination with the journal boxes, of a main truck frame comprising side members located above the respective journal boxes, pedestals secured on said side members of the main truck frame and depending therefrom, said pedestals being slidably fitted over the respective journal boxes so as to move vertically thereon, and the lower portions of said pedestals being slotted vertically, and an equalizer comprising a substantially straight horizontal I-beam whose flanges are removed from its opposite end portions, said end portions being slidably fitted in the vertical slots in the contiguous pedestals, beneath the respective journal boxes coöperating therewith, the end portions of said I-beam being connected to the respective journal boxes, guides on said I-beam arranged and adapted to slidably engage the respective pedestals, whereby the I-beam is permitted to move vertically but is held against independent endwise movement, and springs interposed between said I-beam and adjacent side member of the main truck frame.

Signed at Sacramento, California, this 12th day of January, 1911.

OTTO B. SCHOENKY.

Witnesses:
AMMOR CLAY,
CHAS. S. KING.